United States Patent [19]

Campbell et al.

[11] 3,905,231

[45] Sept. 16, 1975

[54] GAS METER PART

[75] Inventors: Earle E. Campbell; James E. Fosnaugh, both of Lancaster, Ohio

[73] Assignee: National Meter Parts, Lancaster, Ohio

[22] Filed: Dec. 27, 1973

[21] Appl. No.: 428,818

[52] U.S. Cl. .................................. 73/267; 73/278
[51] Int. Cl.² ..................... G01F 3/22; G01F 15/16
[58] Field of Search...................... 73/267, 272, 278

[56] References Cited
UNITED STATES PATENTS

| | | | |
|---|---|---|---|
| 1,884,888 | 10/1932 | Seibert et al............................ | 73/272 |
| 3,386,288 | 6/1968 | Fairchild................................ | 73/272 |
| 3,693,444 | 9/1972 | Carroll................................... | 73/268 |

FOREIGN PATENTS OR APPLICATIONS

| | | | |
|---|---|---|---|
| 722,072 | 1/1955 | United Kingdom................... | 73/272 |

*Primary Examiner*—Herbert Goldstein
*Attorney, Agent, or Firm*—Cennamo Kremblas & Foster

[57] ABSTRACT

A gas activated pressure diaphragm that produces a reciprocating motion having a plurality of sections driven by a flag rod attached to the center pan of the diaphragm by a bracket. The bracket comprises a synthetic material base secured to the center pan of the diaphragm and a snap-on clip-like structure of the same synthetic material to provide an oval slot center to secure the flag rod but yet permit freely the reciprocating motion.

4 Claims, 4 Drawing Figures

GAS METER PART

BACKGROND

Several commercial gas meters include diaphragms pulsating in response to gas pressure. A center pan mechanism, including an orbital center pan sequentially controls the flow of gas to and from the chambers of the meter. The diaphragms are reciprocated by gas pressure and are operatively connected through a suitable motion-transmitting linkage to the valve cover so as to cause the center pan to orbit in a circular path and to alternately open and close the passages leading to and from the diaphragm chambers of the meter. A flow-indication index mechanism is operatively connected to be driven by the center pan, so as to record the movement thereof which is proportional to the volume of gas flowing through the meter.

In gas meters of this type, the driving connection between the orbital center pan and the index mechanism includes an outwardly projecting bracket fixed to the center pan for a flag rod of the index drive of to impart a rotative motion thereto. The bracket is fo generally hemispherical shape and is formed integral with or otherwise rigidly secured to the center pan. Both the flag rod is made of steel whereas the bracket is usually fabricated from a metal alloy, or a plastic, or a combination of plastic with either steel or bronze. As the flag rod moves in its circular orbit the bracket also moves around the axis of the center pan. Thus, a sliding contact is maintained between the flag rod and the bracket which produces friction and consequent wear upon these parts. Additionally, when the bracket and flag rod become sufficiently worn, these parts tend to bind and cause the center pan to tilt or cock at an angle with respect to its associated valve seat, thus causing undesired leakage of gas from one chamber to another with resultant inaccuracy of meter indication.

As with all metering devices the disassembly and assembly of parts is a critical operation. In the aforementioned prior known gas meters the center pan had to be disassembled to remove and replace the brackets supporting the flag rod; also in some types of meters the flag rod had to be removed. Once the new bracket was replaced the meter had to again be calibrated.

SUMMARY OF INVENTION

The present invention is for a new and improved gas meter diaphragm with a bracket having a snap-on type of holder for the flag rod. The material is improved synthetic thereby eliminating corrosion; and by its construction the oval slot provides a straight line diaphragm travel with low differential. To provide ease with reliability of installing the brackets the outer portion of the slot wall is snapped-on. Once on it is extremely rugged and firm. The inner and permanent part of the bracket is welded to the center pan of the diaphragm.

OBJECTS

It is, therefore the primary object of this invention to provide an improved antifriction drive connection between the orbital center pan and the flag rod of a gas meter.

It is another object of this invention to provide a bracket on the center pan in a manner that it may be readily replaced without disturbing the meter.

It is a further object of this invention to provide a center pan flag rod which may be readily fabricated from a self-lubrication material having a relatively low coefficient of friction.

It is also an object of this invention to provide a center pan for a meter of this type having a rotatably mounted bracket that may be economically fabricated as a replacement part for previously installed meters.

These and other objects and advantages of this invention will be readily apparent from the following detailed description and accompanying drawings.

DETAILED DESCRIPTION OF DRAWINGS

Figure 3:
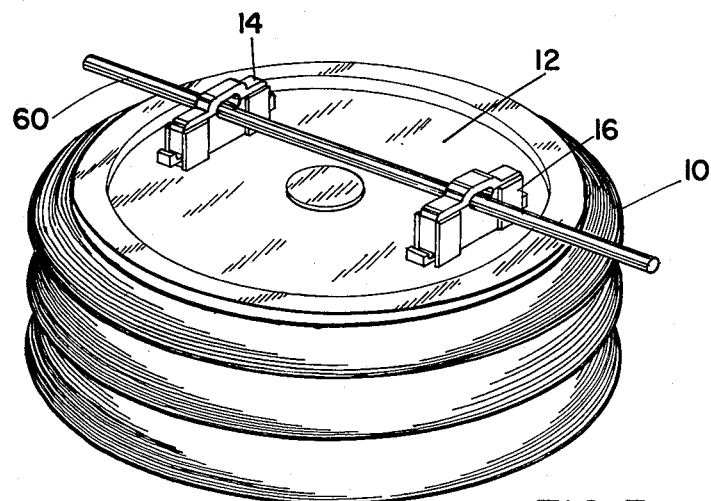
FIG. 3 is an overall view in perspective of the complete embodiment of the invention.

With particular reference to FIG. 3 there is illustrated in perspective a gas meter diaphragm 10 with a center pan 12 having oppositely positioned thereon two flag rod brackets 14 and 16.

The function of the gas meter diaphragm 10 together with its brackets 14 and 16 is similar to those of the prior art. That is, the brackets 14 and 16 each provide an oval slot that secures the flag rod to the diaphragm but yet permits the diaphragm to move in and out in response to a circular force from the flag rod.

Figure 1:
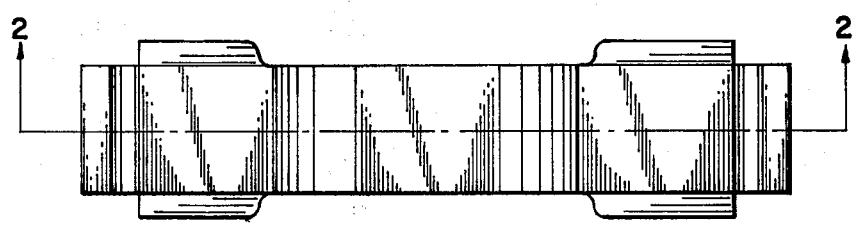
FIG. 1 is a top view of the bracket of the preferred embodiment of the invention.
Figure 2:
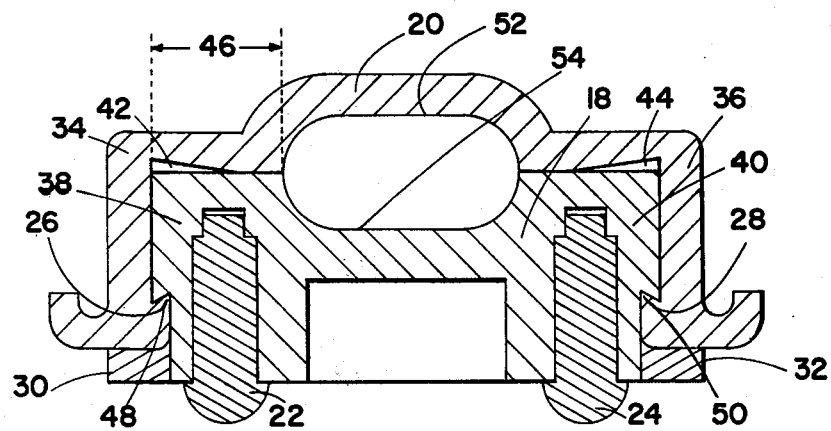
FIG. 2 is a crossectional view of the bracket of FIG. 1.
Figure 4:
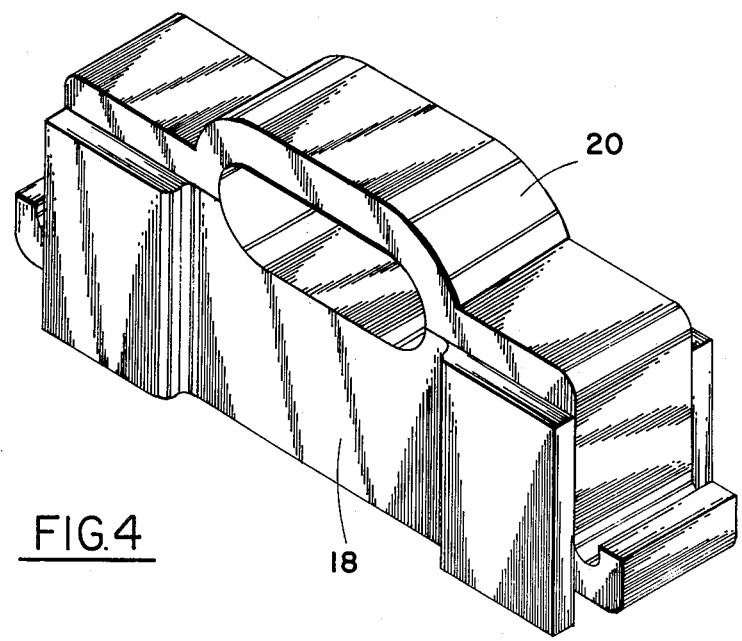
FIG. 4 is a view in perspective of the bracket of the present invention.

With reference to the perspective view of FIG. 4 and the crossectional view of FIG. 2 the improved structure of the bracket of the present invention is illustrated. The bracket comprises two parts, the base 18 and the clip-on top 20. The two parts are made of polypropyline material to eliminate rust or corrosion and to provide a self lubrication.

Alternatively the two parts may be made of acetal resin.

Specifically the two brackets 14 and 16 are positioned on opposite sides of the center pan 12 in a supporting manner for the flag rod 60. Further with the oval slots in the brackets the center pan moves linearly whereas the driving flag rod moves circumferentially.

With specific reference to the crossectional view of FIG. 2, the base 18 is secured to the center pan 12 by means of screws 22 and 24 fitted into tapped holes 23 and 25. It is appreciated that other securing means such as welding or bonding may be preferred — especially since the base need never be removed or replaced.

On either side of the base 18 are undercuts 26 and 28 with flanges 30 and 32 to be fixedly positioned on the base 18 in the snap-on flag rod holder 20. The overall holder 20 provides a certain amount of resiliency — but yet enough stiffness for rigidity. The extreme ends, sides 34 and 36 of the holder 20 fold over the base 18 ends 38 and 40. To provide a tight grip of the ends 34 and 36 with the base ends 38 and 40, the ends 34 and 36 are fabricated to normally extend inwardly. When the ends 34 and 36 are extended outwardly to the side of the base 18 the gaps 42 and 44 are formed. To assure that there is a tight fit of the upper part 20 over the base 18 the dimensions indicated at 46 and 48 must be accurately related to the corresponding portion of the base 18.

The sides 34 and 36 of upper part 20 have inwardly extending ends 48 and 50 engaging the complimentary walls 26 and 28 of the base 18. It is also essential that the inwardly ends 48 and 50 extend themselves upwardly. In this way when the upper portion 20 is snapped on the base 18 the sides 34 and 36 will be locked to the walls of the base 18 by the ends 26 and 28. It can be appreciated that the dimensions of the ends 48 and 50 must correspond to its corresponding walls 26 and 28.

The base is formed with a centrally located depression 54 having one half oval shape. Similarly the upper part 20 is formed in shape to correspond to the depression in the base. In this way when the upper part 20 is positioned on the base 18 an oblong shaped walled area 56 is formed.

It is through the oval area 56 that the flag rod is loosely secured to the center pan of the diaphragm. As noted above the movement of the diaphragm is a reciprocating movement whereas the flag rod rotates orbitally. Accordingly the slot 54 must have an oval shape for free movement of the flag rod without binding. Also since the entire structure is composed of a self lubricating material rust and corrosion are prevented as well as a lubricant for the flag rod.

What is claimed is:

1. In a gas meter of the type comprising a diaphragm driven center pan assembly and a flag rod secured to said center pan operative in an orbital movement to move said diaphragm in a reciprocating movement, means for securing said rod comprising:
   a bracket including an upper portion and a base fixedly secured to said center pan;
   said upper portion having folding sides of a complimentary dimension to grip the outside walls of said base and the lower ends on said outside walls extending inwardly and upwardly to lock complimentary ends of said folding sides onto said base;
   said base having formed therein a one half oval depression;
   said upper part also having formed therein a one half oval portion, said oval slots having its greater dimension in the horizontal, and wherein when said upper portion is fixed in said base portion an oval slotted area is formed in said bracket to receive and movably return said flag rod.

2. The gas meter diaphragm center pan bracket of claim 1 wherein said bracket is made of a self lubricant material.

3. The bracket of claim 2 wherein said self lubricant material is polypropyline.

4. The bracket of claim 1 wherein said folded sides form a cross dimension slightly less than the cross dimension of the base of said bracket.

* * * * *